United States Patent [19]

Lee

[11] Patent Number: 5,303,039
[45] Date of Patent: Apr. 12, 1994

[54] DATA READ DEVICE AND METHOD FOR VIDEO MEMORY INCLUDING FIRST AND SECOND VIDEO MEMORIES AND IMAGE DATA SEPARATOR

[75] Inventor: Hyoung-Ju Lee, Seoul, Rep. of Korea

[73] Assignee: Samsung Electronics Co., Ltd., Kyonggi, Rep. of Korea

[21] Appl. No.: 24,369

[22] Filed: Mar. 1, 1993

[30] Foreign Application Priority Data

Feb. 28, 1992 [KR] Rep. of Korea ............... 92-3246

[51] Int. Cl.⁵ ............................................. H04N 9/64
[52] U.S. Cl. ..................................... 348/708; 348/663
[58] Field of Search ................. 358/160, 21 R, 31, 40; 345/186, 187, 188, 150, 154; H04N 9/64

[56] References Cited

U.S. PATENT DOCUMENTS 4,432,009 2/1984 Reitmeier ........................ 358/21 R
4,589,020 5/1986 Akatsuka ........................... 358/160
4,792,856 12/1988 Shiratsuchi ........................ 358/180

Primary Examiner—James J. Groody
Assistant Examiner—Sherrie Hsia
Attorney, Agent, or Firm—Sughrue, Mion, Zinn, Macpeak & Seas

[57] ABSTRACT

The present invention relates to a video memory in a digital image processing device, and more particularly to a data read device for a video memory capable of reading plural types of data recorded together in a predetermined ratio as recorded beforehand in an initial memory. In particular, luminance signal data and chrominance signal data are recorded intermingled with one another in a video memory in proportion to a ratio determined by the composite image signal. The circuitry of the present invention then separates the luminance signal data and the chrominance signal data, so that signal processing can be executed. As a result, since the data can be recorded in a mixed fashion and then separated, video memory space is used more efficiently.

12 Claims, 4 Drawing Sheets

FIG. 3a

ROW ADDRESS 1, COLUMN ADDRESS 0–511

FIRST VIDEO MEMORY OUTPUT:

| 0 | 1 | 2 | 3 | 4 | 5 | ... | 511 |
|---|---|---|---|---|---|-----|-----|
| Y1 | Y2 | C2 | Y5 | Y6 | C4 | ... | |

SECOND VIDEO MEMORY OUTPUT:

| C1 | Y3 | Y4 | C3 | Y7 | Y8 | ... | |

FIG. 3b

FIRST VIDEO MEMORY OUTPUT:

| Y1 | Y2 | C2 | Y5 | Y6 | C4 | ... |

SECOND VIDEO MEMORY OUTPUT:

| C1 | Y3 | Y4 | C3 | Y7 | Y8 | ... |

FIG. 3c

SECOND F/F OUTPUT:

| ✕ | Y1 | Y2 | C2 | Y5 | Y6 | C4 | ... |

THIRD F/F OUTPUT:

| C1 | Y3 | Y4 | C3 | Y7 | Y8 | ... |

FIG. 3d

FOURTH F/F OUTPUT:

| ✕ | Y1 | Y2 | C2 | Y5 | Y6 | ... |

FIFTH F/F OUTPUT:

| C1 | Y3 | Y4 | C3 | Y7 | Y8 | |

FIG. 3e

SIXTH F/F OUTPUT:

| Y1 | Y2 | C2 | Y5 | Y6 | C4 | ... |

NINTH F/F OUTPUT:

| C1 | Y3 | Y4 | C3 | Y7 | Y8 | ... |

FIG. 3f

FIRST MULTIPLEXER OUTPUT:

| Y1 | Y2 | Y3 | Y4 | Y5 | Y6 | Y7 | Y8 | Y9 | Y10 | ... |

SECOND MULTIPLEXER OUTPUT:

| C1 | C2 | C3 | C4 | C5 | ... |

FIG. 3g

FIRST MULTIPLEXER OUTPUT:

| Y1 | Y2 | Y3 | Y4 | Y5 | Y6 | Y7 | Y8 | Y9 | Y10 | ... |

TENTH F/F OUTPUT:

| C1 | C3 | C5 |

ELEVENTH F/F OUTPUT:

| C2 | C4 | C6 |

FIG.4a SERIAL CLOCK
FIG.4b FIRST CLOCK
FIG.4c SECOND CLOCK
FIG.4d THIRD CLOCK
FIG.4e FOURTH CLOCK
FIG.4f FIFTH CLOCK

DATA READ DEVICE AND METHOD FOR VIDEO MEMORY INCLUDING FIRST AND SECOND VIDEO MEMORIES AND IMAGE DATA SEPARATOR

BACKGROUND OF THE INVENTION

1. Field of the Invention

The present invention relates to a video memory in a digital image processing device, and more particularly to a data read device for a video memory capable of reading plural types of data recorded together in a video memory in a predetermined ratio, as it was recorded beforehand in an initial memory. The following disclosure is based on Korean Patent Application No. 92-3246 filed On Feb. 28, 1992, which is incorporated into this application by reference.

2. Description of the Prior Art

A video memory is a means for recording or storing a composite image signal which has been converted to a digital signal. Generally, the composite image signal is comprised of a luminance signal Y and chrominance signals R-Y and B-Y, and, in order to record the digitized composite image signal in a memory, the signal is separated into the luminance signal Y and the chrominance signals R-Y and B-Y, so that luminance data Y and chrominance data R-Y and B-Y can be stored separately.

The data ratio of the luminance signal Y and chrominance signals R-Y and B-Y forming the composite image signal is set at 4:1:1, which can then be directly recorded and read out onto the video memory. However, when luminance data and chrominance data having different ratios are stored to a separate memory, using a standardized, conventional memory, there arises a disadvantage in that a great deal of memory space is wasted.

SUMMARY OF THE INVENTION

As a result, in order to optimize memory capacity, the luminance data Y and chrominance data RY and B-Y are mixedly recorded on the video memory in proportion to the ratio of the composite image signal.

Accordingly, it is a general object of the present invention to provide a data read device for a video memory in which, in order to reduce the amount of memory space wasted in the video memory, R-Y data and B-Y data mixedly recorded on a video memory are read to thereby execute signal processing.

In accordance with this invention the above object is achieved by providing devices which comprise:

a first and second video memory wherein luminance signal data and chrominance signal data forming a composite image signal are recorded intermixed with one another in a predetermined ratio;

a clock generator for generating a clock signal and a control signal having predetermined frequencies in accordance with an input reference clock signal, a horizontal synchronizing signal and a vertical synchronizing signal;

an address generator for generating address signals supplied to the first and second video memories in response to the control signal generated by the clock generator;

an image data separator for separating the luminance signal data from the chrominance signal data and outputting the luminance and chrominance signal data, wherein the image data separator receives data from the first and second video memories and outputs the luminance and chrominance signal data in response to the clock signal from the clock generator; and a digital-to-analog converter for converting the luminance signal data and chrominance signal data separated by the image data separator into an analog signal.

BRIEF DESCRIPTION OF THE DRAWINGS

For a more complete understanding of the nature and objects of the invention, reference should be made to the following detailed description taken in conjunction with the accompanying drawings in which:

FIGS. 3a through 3g are data maps of an image signal in accordance with the present invention; and FIGS. 4a through 4f are timing diagrams of a data read device for a video memory in accordance with the present invention.

DETAILED DESCRIPTION OF THE PREFERRED EMBODIMENTS OF THE INVENTION

The data read device for the video memory in accordance with the present invention is provided with a reading means that reads data from a video memory, in which a composite image signal composed of luminance signal data and chrominance signal data is recorded to be intermingled and in a predetermined ratio. The device is further provided with a separating means that separates the read data into luminance and chrominance data.

Figure 1:
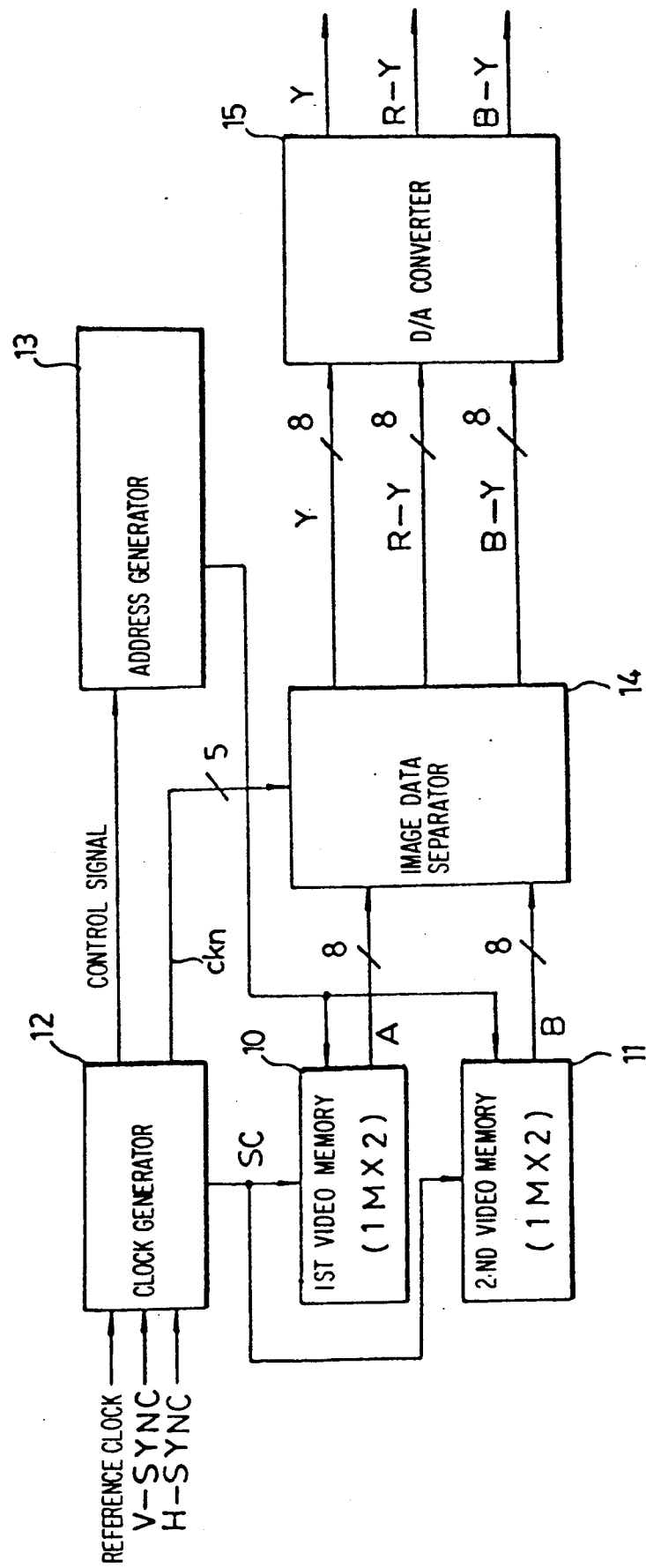
FIG. 1 is a block diagram of a data read device for a video memory in accordance with the present invention.

FIG. 1 is a block diagram of a preferred embodiment of the data read device in accordance with the present invention.

According to FIG. 1, the data read device for the video memory includes a first and second video memories 10 and 11, a clock generator 12, an address generator 13, and an image data separator 14. The first and second video memories 10 and 11 store the luminance signal data and chrominance signal data forming the composite image signal such that the two types of data are mixed together in a predetermined ratio. The clock generator 12 generates a clock signal CKn as well as a serial control signal SC, each having a predetermined frequency that is determined by a reference clock signal, a horizontal synchronizing signal and a vertical synchronizing signal input into the clock generator 12. The address generator 13 generates address signals for the first and second video memories 10 and 11. These address signals are generated in response to the control signal generated by the clock generator 12. The image data separator 14 separates and outputs the luminance signal data and the chrominance signal data in response to the clock signal CKn output by the clock generator 12. The separator 14 receives data input from the first and second video memories 10 and The Digital-to-Analog (D/A) converter 15 converts the luminance signal data and chrominance signal data input from the image data separator 14 into an analog signal.

Figure 2:
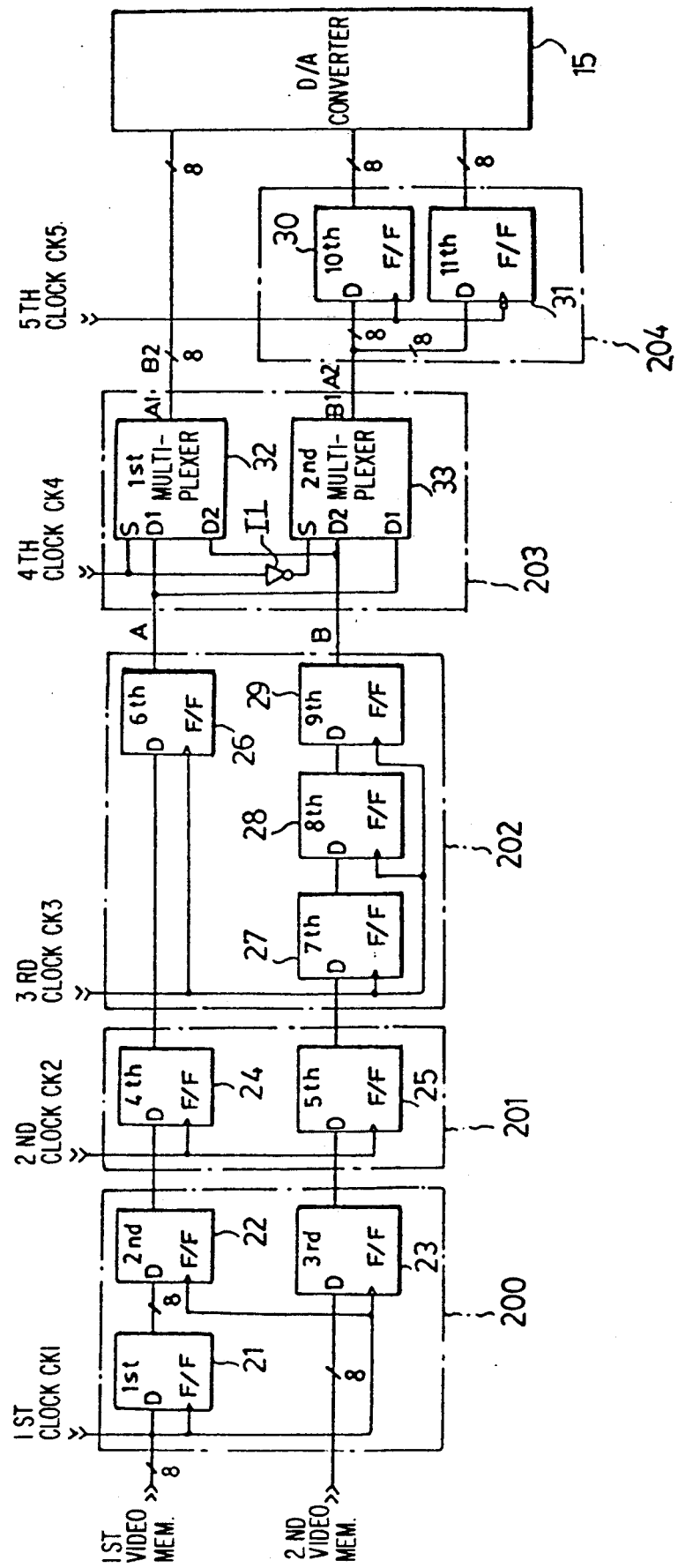
FIG. 2 is a circuit diagram of an image data separating means as illustrated in FIG. 1.

FIG. 2 is a circuit diagram of an image data separator as illustrated in FIG. 1.

According to FIG. 2, the circuit of the image data separator includes a delay 200, a first latch 201, a second latch 202, a first separator 203, and a second separator 204. The delay 20 receives data from the first and second video memories 10 and 11, and operates in response to a first clock signal. The first latch 201 receives data from the delay 200 and operates in response to a second clock signal. The second latch 202 receives data from the first latch 201 and operates in response to a third clock signal. The first separator 203 receives data from the second latch 202 and operates in response to a fourth clock signal. The second separator 204 receives data from the first separator 203 and operates in response to a fifth clock signal.

The D/A converter 15 converts digital data output by the first and second separators 203 and 204 into analog signals to thereafter output the same.

In greater detail, the delay 200 includes three flip flops. The first flip flop 21 receives data from the first video memory 10 and is controlled by the first clock signal CK2. The second flip flop 22 receives output data from the first flip flop 21 and is also operated by the first clock signal CK1. The third flip flop 23 receives data output by the second video memory 11 and is operated by the first clock signal CK1.

The first latch 201 includes a fourth and fifth flip flops. The fourth flip flop 24 receives output data from the second flip flop 22 and is controlled by the second clock signal CK2, while the fifth flip flop 25 receives output data from the third flip flop 23 and is also operated by the second clock signal CK2.

The second latch 202 includes an additional four flip flops. A sixth flip flop 26 is controlled by the third clock signal CK3 and receives output data from the fourth flip flop 24. A seventh flip flop 27 is also operated by the third clock signal CK3 and receives output data from the fifth flip flop 25. An eighth flip flop 28 is controlled by the third clock signal CK3 and receives output data from the seventh flip flop 27 A ninth flip flop 29 is controlled by the third clock signals CK3 and receives output data from the eighth flip flop 28.

The first separator 203 has a first and a second multiplexer 32 and 33 which receive output data from the sixth and ninth flip flops 26 and 29. The multiplexers output data selectively in response to the fourth clock signal CK4.

The second separator 204 has a tenth and an eleventh flip flop 30 and 31 which receive their input data from the second multiplexer 33 and output the data selectively in response to the fifth clock signal CK5.

FIGS. 3a through 3g are data maps of an image signal in accordance with the preferred embodiment being described.

FIG. 3a is a data ma representing the state of an image signal stored in the first and second video memories 10 and 11.

FIGS. 3b through 3g are image signal data maps depicting respective outputs from the first and second video memories 10, 11, the delay 200, the first latch 201, the second latch 202, the first separator 203 and the second separator 204.

FIGS. 4a through 4f are timing diagrams of a data read device for a video memory in accordance with a preferred embodiment of the present invention.

FIG. 4a is a waveform diagram of a serial clock signal SC which is output by the clock generating means 12 to thereafter be supplied to the first and second video memories 10 and 11.

FIG. 4b through 4f are waveform diagrams of the first, second, third, fourth and fifth clock signals CK1, CK2, CK3, CK4 and CK5 provided by the clock generating means 12 to the image data separator 14.

Accordingly, the clock generator 12, into which the reference clock signal, the horizontal and the vertical synchronizing signals are input, as illustrated in FIG. 1, generates a serial clock signal SC as illustrated in FIG. 4a. It further generates a first, second, third, fourth and fifth clock signals (CKn: CK1 CK2, CK3, CK4 and CK5) as illustrated in FIGS. 4b, 4c, 4d, 4e and 4f, and an address generator control signal.

Composite image signals composed of luminance signal data Y, and chrominance signal data R-Y and B-Y are recorded in the first and second video memories 10 and 11 in a mixed format Yn, Cm (n: 1~682; m: 1~340). In response to an address signal output from the address generator 13 and the serial clock signal output from the clock generator 12, the video memories 10 and 11 provide this data as an output.

In the particular embodiment described here, the luminance signal Yn and chrominance signal Cm are recorded respectively in the forms of Y1, Y2, C2, Y5, Y6, C4, . . . and C1, Y3, Y4, C3, Y7, Y8, . . . in the first and second video memories 10 and 11, as illustrated in FIG. 3a.

When the serial clock signal SC, which has a repeated period form of 2:1:1, as illustrated in FIG. 4a, is input into the first and second video memories 10 and 11, data is output from those memories having a form as illustrated in FIG. 3b.

Here, the variable n (1~682) of the luminance signals Yn recorded in the first and second video memories 10 and 11 is a number wherein 52 $\mu$s (which is an image signal period of the horizontal synchronizing signal period) is divided by 76 ns (which is an inverse number of the sampling rate designed to make a chrominance subcarrier suitable for sampling). In other words, 52 $\mu$s/76 ns $\approx$ 682.

Furthermore, in the composite image signal, a variable m (1~340) of the chrominance signal Cm becomes the aggregate data value for the chrominance signals R-Y and B-Y. This is so because a data ratio of 4:1:1 for the luminance signal data Y and chrominance signal data R-Y and B-Y yields 682:170:170.

The number of data addresses for the image signal comes to 1022 in rows. Data addresses corresponding to 512 scanning lines suffice, because signals which have nothing to do with the image signals are subtracted from 525 scanning lines. As such, only data addresses corresponding to 512 scanning lines remain, so that a memory capacity of 4 Mbit is needed in case an 8-bit data is necessary to display one pixel.

As illustrated in FIG. 3b, the luminance signal data and chrominance signal data output from the first and second memories 10 and 11 in a repeated period form of 2:1:1 are input to the image data separator 14.

Thus, the luminance signal data and chrominance signal data supplied from the first video memory 10 to the image data separator 14 as illustrated in FIG. 3b are input to the first flip flop 21 of the delay 200 10 shown in FIG. 2.

The output of the first flip flop 21 is input to the second flip flop 22, which is operated by the first clock signal CK1 illustrated in FIG. 4b.

Likewise, as seen from FIG. 3b, the luminance signal data and chrominance signal data are supplied from the second video memory 11 to a third flip flop 23 of the delay 200 shown in FIG. 2.

Because the first and second flip flops 21 and 22 operated by the first clock CK1 shown in FIG. 4b are connected in series, the output of the second flip flop 2 is delayed relative to that of the third flip flop 23 by one clock period.

In other words, the luminance signal data and chrominance signal data output from the second and third flip flops 22 and 23 of the first delay 200, as illustrated in FIG. 2c, are output such that the output data of the first video memory 10 is delayed by one clock field relative to that of the second video memory 11.

The luminance signal data and chrominance signal data output from the second and third flip flops 22 and 23 of the delay 200 as illustrated in FIG. 3c are transferred to the first latch 201.

In particular, luminance signal data and chrominance signal data input to the first latch 201, as illustrated in FIG. 3c, are input to a fourth and fifth flip flops 24 and 25. These flip flops are controlled by the second clock signal CK2 and have a repeated period form of 2:1:1.

The data input to the fourth and fifth flip flops 24 and 25 of the first latch 201 as illustrated in FIG. 3c is output in the form illustrated in FIG. 3d by means of the second clock signal CK2, as mentioned above.

In other words, the output of the fourth flip flop 24 is output in such a manner that it is more delayed than the output of the fifth flip flop 2 by two clock pulses.

The data from the fourth and fifth flip flops 24 and 25 of the first latch 201, as illustrated in FIG. 3d, is respectively transferred to the sixth and seventh flip flops 26 and 27 of the second delay 202.

The output of the seventh flip flop 27 is input to the eighth flip flop 28. The output of the eighth flip flop 28 is, in turn, input to a ninth flip flop 29. A third clock signal CK3 having a constant period as illustrated in FIG. 4d is supplied to respective flip flops 26, 27, 28, and 29 in the second delay 202.

Accordingly, the data which has passed through the seventh, eighth and ninth flip flops 27, 28, and 29 is delayed by two clock pulses relative to that of the sixth flip flop 26. FIG. 3e shows the form in which the data is output from the sixth flip flop 26 and from ninth flip flop 29. In other words, the output of the fifth flip flop 25, which precedes by two clock periods the output of the fourth flip flop 24 in the first latch 201, is output from the second latch 202 with two clock pulses delay time.

The data output from the sixth and ninth flip flops 26 and 29 of the second latch 202 as illustrated in FIG. 3e is then input to the first and second multiplexers 32 and 33 of the first separator 203.

The first and second multiplexers 32 and 33 choose one of the two data lines from the second latch 202 in accordance with the fourth clock signal CK4 shown in FIG. 4e as an address signal. In other words, the first multiplexer 32 receives as respective inputs D1 and D2 the outputs of the sixth and ninth flip flops 26 and 29 shown in FIG. 3e, while the second multiplexer 33 receives as respective inputs D1 and D2 the outputs of the ninth and sixth flip flops 29 and 26.

Therefore, the first multiplexer 32, when the fourth clock CK4 is in a high state, outputs the luminance signals Y1, Y2 which are input at D1 in FIG. 2. When in a low state, the first multiplexer 32 outputs the luminance signals Y3, Y4 which are input at D2. As seen from the foregoing, the first multiplexer 32 selectively outputs luminance signals Y1, Y2, Y3, Y4, Y5, . . . , as illustrated in FIG. 3f.

Similarly, the second multiplexer 33 selects one of the inputs D and D22. The fourth clock CK4 is inverted by an inverter I1 and applied to the second multiplexer 33. Accordingly, the second multiplexer 33, when the fourth clock CK4 is in a high state, outputs a chrominance signal C1 which is input at D2.

When in a low state, the second multiplexer 33 outputs a chrominance signal C2 which is input at D1. Thus, the second multiplexer 33 selectively outputs chrominance signals C1, C2, C3, . . . , as illustrated in FIG. 3f.

The signal outputted from the second multiplexer 33 is input to the second separator 204. The second separator 204 includes a tenth flip flop 30, which is operated at a rising edge of a fifth clock signal CK5, and an eleventh flip flop 31, which is operated at a falling edge of the fifth clock signal CK5, as illustrated in FIG. 4f.

Therefore, the tenth flip flop 30, when the chrominance signal C1 is input, delays the chrominance signal by four clocks to thereafter output the same. Similarly, the eleventh flip flop 31, when the chrominance signal C2 is input, delays the chrominance signal by four clocks to thereafter output the same. These outputs are supplied to the D/A converter 15, as shown in FIG. 2. FIG. 3g shows the form in which data is supplied to the D/A converter 15.

In other words, the luminance signal Yn from the first multiplexer 32 of the first separator 203 and the chrominance signal Cm from the tenth and eleventh flip flops 30 and 31 of the second separator 204 form the input to the D/A converter 15.

In the FIG. 3g data map, the luminance signals Y1, Y2, Y3, . . . are the luminance signals of the composite image signal. The chrominance signals C1, C3, . . . are R-Y signals of the composite image signal and the chrominance signals C2, C4, . . . are B-Y signals of the composite image signal.

The D/A converter 15, as explained above, converts the separated luminance signal and chrominance signal into analog signals and then outputs the same.

As is apparent from the foregoing, the present invention allows composite image signal data, formed of at least two types of data stored together in an initial video memory, to be processed in a manner that reduces inefficiencies in the use of memory.

Although the invention has been described in detail with reference to its presently preferred embodiments, it will be understood by one of ordinary skill in the art that various modifications can be made without departing from the spirit and scope of the invention.

What is claimed is:

1. A data read device for a video memory comprising:
   first and second video memories which record luminance signal data and chrominance signal data in an intermingled format and in a predetermined ratio;
   a clock generator which generates a clock signal and a control signal, the signals having predetermined frequencies, in accordance with an input reference clock signal, an input horizontal synchronizing signal and an input vertical synchronizing signal;
   an address generator that generates an address signal and supplies the address signal to the first and second video memories in response to the control signal generated by the clock generator;
   an image data separator, responsive to the clock signal from the clock generator, that receives inputs of data output by the video memories, separates the luminance signal data and the chrominance signal data, and outputs the luminance signal data and the chrominance signal data; and a digital-to-analog converter for converting the luminance signal data and the chrominance signal data separated by the image data separator into an analog signal.

2. A data read device for a video memory as defined in claim 1, wherein the image data separator comprises:
   a delayer for delaying by one clock pulse one data stream read out from one of the first and second video memories;
   a first latch for receiving data streams from the delayer and adjusting an output time of the clock-delayed data stream relative to that of an undelayed data stream;
   a second latch for delaying one data stream output by the first latch to thereby further adjust the relative output times of the data streams;
   a first separator for receiving the data from the second latch and separating the luminance signal data from the chrominance signal data; and
   a second separator that receives the chrominance signal data from the first separator and separates R-Y chrominance signal data from B-Y chrominance signal data.

3. A data read device for a video memory as defined in claim 2, wherein the delayer comprises:
   a first flip flop which receives data from one of the first and second video memories and is controlled by a first clock signal having a first frequency;
   a second flip flop which receives the output data from the first flip flop and is controlled by the first clock signal; and
   a third flip flop which receives data other than the data input to the first flip flop and is controlled by the first clock signal.

4. A data read device of a video memory as defined in claim 3, wherein the first latch comprises:
   a fourth flip flop which receives data output by the second flip flop and which is controlled by a second clock signal having a second frequency; and
   a fifth flip flop which receives data output by the third flip flop and which is controlled by the second clock signal.

5. A data read device for a video memory as defined in claim 4, wherein the second latch comprises:
   a sixth flip flop that receives data output by the fourth flip flop and that is controlled by a third clock signal having a third frequency;
   a seventh flip flop that receives data output by the fifth flip flop and that is controlled by the third clock signal;
   a eighth flip flop that receives data output by the seventh flip flop and that is controlled by the third clock signal; and
   a ninth flip flop that receives data output by the eighth flip flop and that is controlled by the third clock signal.

6. A data read device for a video memory as defined in claim 5, wherein the first separator comprises first and second multiplexers which receive data output by the sixth and ninth flip flops and are controlled by a fourth clock signal as an address signal.

7. A data read device for a video memory as defined in claim 6, wherein the second separator comprises:
   a tenth flip flop which receives data output by the second multiplexer and is controlled by a rising edge of a fifth clock signal; and
   an eleventh flip flop which also receives data output by the second multiplexer and is controlled by a falling edge of the fifth clock signal.

8. A data read device of a video memory as defined in claim 2, wherein the first latch comprises:
   a first flip flop which receives data output by the delayer and which is controlled by a clock signal; and
   a second flip flop which receives further data output by the delayer and which is controlled by the clock signal.

9. A data read device for a video memory as defined in claim 2, wherein the second latch comprises:
   a first flip flop that receives data output by the first latch and that is controlled by a clock signal;
   a second flip flop that receives further data output by the first latch and that is controlled by the clock signal;
   a third flip flop that receives data output by the second flip flop and that is controlled by the clock signal; and
   a fourth flip flop that receives data output by the third flip flop and that is controlled by the clock signal.

10. A data read device for a video defined in claim 2, wherein the first separator comprises first and second multiplexers which receive, respectively, data output by the second latch and further data output by the second latch, and which are controlled by a clock signal as an address signal.

11. A data read device for a video memory as defined in claim 2, wherein the second separator comprises:
    a first flip flop which receives data output by the first separator and is controlled by a rising edge of a clock signal; and
    an second flip flop which receives further data output by the first separator and is controlled by a falling edge of the clock signal.

12. A data reading method for reading video data from a memory, comprising the steps of:
    storing data representing a composite image signal comprising luminance signal data and chrominance signal data in a first video memory and in a second video memory, such that luminance signal data and chrominance signal data are stored in an intermingled fashion and in a predetermined ratio;
    generating a control signal and a plurality of clock signals of predetermined frequency in accordance with horizontal and vertical synchronizing signals and a reference clock signal;
    receiving the stored data and separating the luminance signal data from the chrominance signal data in response to the generated clock signals; and
    outputting the separated data to a converter for converting the separated data into an analog signal.

* * * * *